US011693378B2

(12) United States Patent
Bernstein et al.

(10) Patent No.: US 11,693,378 B2
(45) Date of Patent: Jul. 4, 2023

(54) IMAGE-BASED SOLAR ESTIMATES

(71) Applicant: Alliance for Sustainable Energy, LLC, Golden, CO (US)

(72) Inventors: Andrey Bernstein, Golden, CO (US); Huaiguang Jiang, Aurora, CO (US); Benjamin Kroposki, Littleton, CO (US); Yu Xie, Superior, CO (US); Rui Yang, Golden, CO (US); Yingchen Zhang, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 624 days.

(21) Appl. No.: 16/806,797

(22) Filed: Mar. 2, 2020

(65) Prior Publication Data
US 2020/0278650 A1    Sep. 3, 2020

Related U.S. Application Data

(60) Provisional application No. 62/812,930, filed on Mar. 1, 2019.

(51) Int. Cl.
*G05B 19/042* (2006.01)
*G06N 3/02* (2006.01)
(Continued)

(52) U.S. Cl.
CPC ............ *G05B 19/042* (2013.01); *G06N 3/02* (2013.01); *G06T 1/0014* (2013.01); *G06T 7/00* (2013.01);
(Continued)

(58) Field of Classification Search
CPC .......... G05B 19/042; G05B 2219/2639; G06N 3/02; G06N 3/0454; G06N 3/0481;
(Continued)

(56) References Cited

U.S. PATENT DOCUMENTS

| 10,409,925 B1* | 9/2019 | Hoff | H02S 50/00 |
| 11,367,142 B1* | 6/2022 | Wang | G06Q 10/10 |
| 2011/0276269 A1* | 11/2011 | Hummel | H02J 3/381 |
| | | | 702/3 |

(Continued)

OTHER PUBLICATIONS

Alzahrani et al., "Solar Irradiance Forecasting Using Deep Neural Networks", Procedia Computer Science, Complex Adaptive Systems Conference with Theme: Engineering Cyber Physical Systems, CAS, Oct./Nov. 2017, vol. 114, pp. 304-313.
Chow et al., "Intra-hour forecasting with a total sky imager at the UC San Diego solar energy testbed", Solar Energy, vol. 85, No. 11, Nov. 2011, pp. 2881-2893.

(Continued)

*Primary Examiner* — Kiet M Doan
(74) *Attorney, Agent, or Firm* — Robert G. Pittelkow

(57) ABSTRACT

An example device is configured to determine, based on a sky image of a portion of sky over a power distribution network and using a convolutional neural network (CNN)-based image regression model, an estimated global horizontal irradiance (GHI) value and manage or control the power distribution network using the estimated GHI value. The device may also be configured to determine, based on GHI values and aggregate load values for at least a portion of the power distribution network, using a Bayesian Structural Time Series model, an estimated photovoltaic power output value for the at least a portion of the power distribution network. The device may manage or control the power distribution network using the estimated photovoltaic power output value.

16 Claims, 7 Drawing Sheets

(51) Int. Cl.
*G06T 7/00* (2017.01)
*G06T 1/00* (2006.01)

(52) U.S. Cl.
CPC ............... *G05B 2219/2639* (2013.01); *G06T 2207/20081* (2013.01); *G06T 2207/20084* (2013.01)

(58) Field of Classification Search
CPC ........ G06N 3/08; G06N 7/005; G06T 1/0014; G06T 7/00; G06T 2207/20081; G06T 2207/20084
USPC ........................... 702/182, 3; 703/6; 345/420
See application file for complete search history.

(56) References Cited

U.S. PATENT DOCUMENTS

| | | | |
|---|---|---|---|
| 2016/0306906 A1* | 10/2016 | McBrearty | H02J 3/381 |
| 2017/0031056 A1* | 2/2017 | Vega-Avila | G06Q 10/0635 |
| 2018/0175790 A1* | 6/2018 | Sanfilippo | H02J 3/38 |
| 2019/0220704 A1* | 7/2019 | Schulz-Trieglaff | G16B 20/20 |
| 2020/0011731 A1* | 1/2020 | Siddiqui | G01J 1/4228 |
| 2021/0004661 A1* | 1/2021 | Le Guen | G06V 10/454 |

OTHER PUBLICATIONS

Jiang et al., "Solar Irradiance Capturing in Cloudy Sky Days—A Convolutional Neural Network Based Image Regression Approach", Solar Irradiance Capturing in Cloudy Sky Days, vol. 8, Jan. 2020, pp. 22235-22248.

* cited by examiner

IMAGE-BASED SOLAR ESTIMATES

CROSS-REFERENCE TO RELATED APPLICATIONS

This application claims the benefit of U.S. Provisional Application No. 62/812,930, filed Mar. 1, 2019, the entire content of which is incorporated herein by reference.

CONTRACTUAL ORIGIN

The United States Government has rights in this invention under Contract No. DE-AC36-08G028308 between the United States Department of Energy and Alliance for Sustainable Energy, LLC, the Manager and Operator of the National Renewable Energy Laboratory.

BACKGROUND

As photovoltaic (PV) energy becomes more important, power grids may have to manage increasingly distributed energy resources. Even modest housing may have PV systems installed to reduce dependence on the grid, and to offset energy costs. As prevalence of these distributed energy resources increases, grid managers, such as those who manage power distribution networks, will need more accurate and precise information regarding the amount of energy available from PV sources in the network.

SUMMARY

In one example, a device includes at least one processor configured to determine, based on a sky image of a portion of sky over a power distribution network, using a convolutional neural network (CNN)-based image regression model, an estimated global horizontal irradiance (GHI) value. The at least one processor is further configured to cause at least one device in the power distribution network to modify operation based on the estimated GHI value.

In another example, a device includes at least one processor configured to determine, based on a sky image of a portion of sky over a power distribution network, an estimated global horizontal irradiance (GHI) value. The at least one processor is further configure to determine, based on the estimated GHI value and an aggregate load value for at least a portion of the power distribution network, using a Bayesian Structural Time Series (BSTS) model that estimates photovoltaic (PV) generation based on GHI values, an estimated PV power output value for the at least a portion of the power distribution network. The at least one processor is further configured to cause at least one device in the power distribution network to modify operation based on the estimated PV power output value for the at least a portion of the power distribution network.

In another example, a method includes determining, by a computing device having at least one processor, based on a sky image of a portion of sky over a power distribution network, using a convolutional neural network (CNN)-based image regression model, an estimated global horizontal irradiance (GHI) value. The method also includes causing at least one device in the power distribution network to modify operation based on the estimated GHI value.

The details of one or more examples are set forth in the accompanying drawings and the description below. Other features, objects, and advantages will be apparent from the description and drawings, and from the claims.

DETAILED DESCRIPTION

Figure 1:
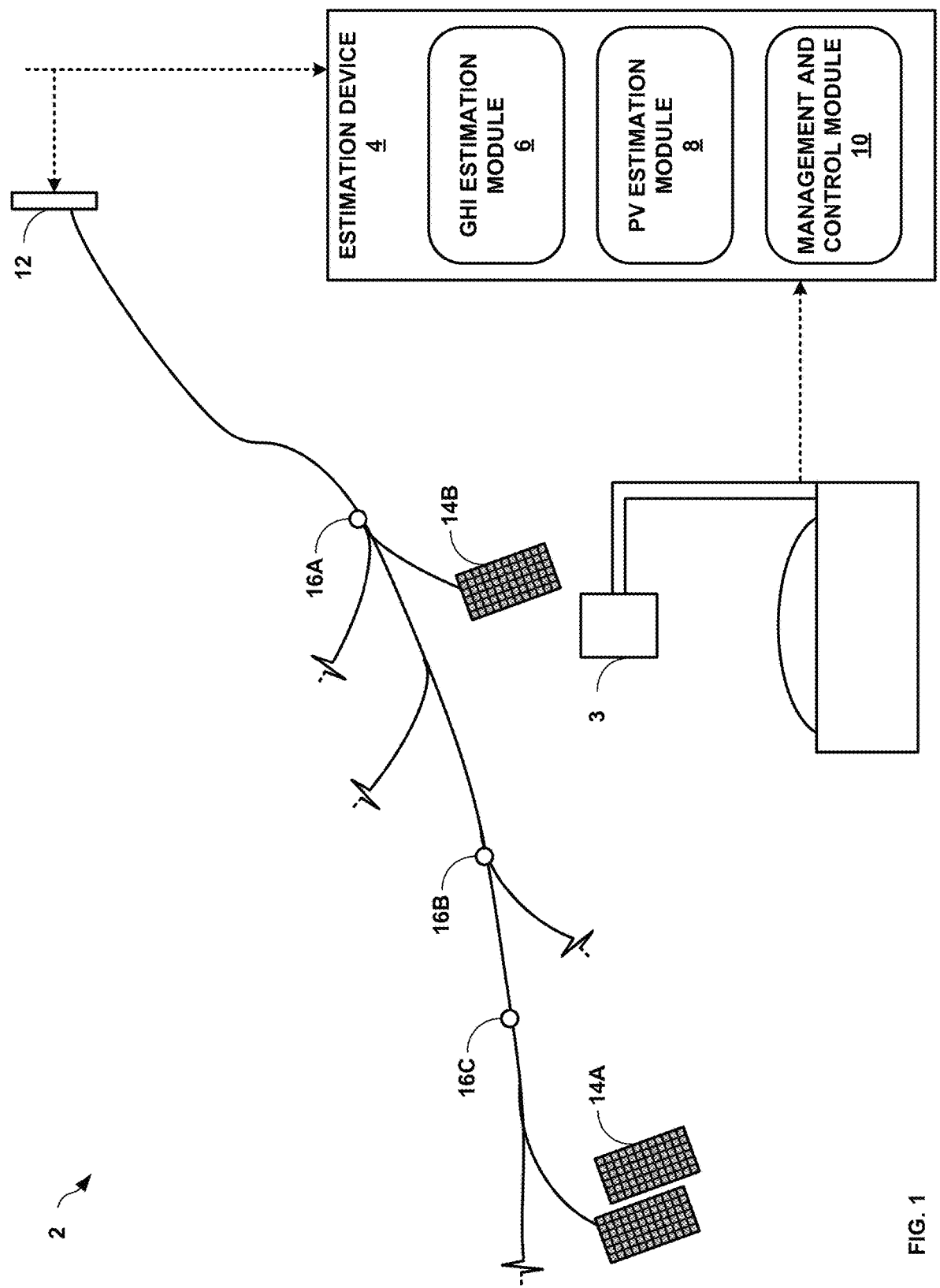
FIG. 1 is a conceptual diagram illustrating an example power distribution system that includes a GHI/PV estimation device configured to estimate solar irradiance and/or PV across a geographic area using sky images, in accordance with one or more aspects of the present disclosure.

The techniques of the present disclosure provide efficient, real time or near real time (e.g., every 100 ms, 1 s, 10 s, 1 min, 10 min, etc.) irradiance and/or distributed photovoltaic (PV) estimates for control of devices within power networks. In one aspect, the techniques described herein may be used to generate an estimated solar irradiance in real time or near real time using sky images and deep learning. For instance, a sky imaging device may capture sky images corresponding to a geographic area of a power distribution network. A computing device configured in accordance with the techniques described herein may employ supervised machine learning to analyze the sky images and estimate global horizontal irradiance (GHI). GHI is defined as the sum of the total received direct and diffuse shortwave solar radiation on a horizontal plane. In another aspect, the techniques described herein may be used to generate estimated PV power output for a geographic area (e.g., a power distribution network) based on irradiance and net load values. For instance, a computing device may use GHI values and power consumption information from a power distribution network to estimate the amount of distributed PV in the geographic area corresponding to the power distribution network. Such irradiance and PV information can be used to manage and control devices in the power distribution network to improve efficiency and reliability.

The total U.S. small-scale PV capacity was forecasted to surpass 34.7 GW by the end of 2021 in residential, commercial, and industrial sectors. On cloudy days, the profile of solar radiation for a particular location may contain stochastic deviations such as abrupt decreases and increases, which cause deviations of PV power output at that location. With the increasing penetration of PV, such large deviations of PV power output can result in problems, including voltage deviation, frequency oscillation, and even unplanned islanding. The convolutional neural network (CNN)-based image regression techniques described herein build a relationship between cloudy sky images and solar radiation values. While solar radiation is a continuous variable with a relatively big range, the techniques described herein provide classification of solar radiation while avoiding large errors and deviations.

In addition, most small-scale solar PV systems are located behind-the-meter on customer premises, where utility companies do not have direct access to their output at any given time. This situation is made more challenging by the fact that dispatcher-accessible data acquisition doesn't normally go beyond the substation. Related-art attempts to better understand the output of all the PV on a distribution circuit are high cost and can require difficult, fundamental changes in the real-time data flows between distribution and bulk operators. In some cases, such exchanges may even be prohibited by regulations. In contrast, the PV power output estimation techniques described herein provide a cheap, efficient solution for unmasking behind-the-meter PV output in real time using a combination of downstream power measurements and local solar irradiance values. In particular, the techniques described herein allow for estimation of the real time power output of behind-the-meter PV systems throughout the distribution feeder.

By using off-the-shelf components, deep learning, and other analysis tools, the techniques of the present disclosure may provide for convenient and accurate determination of GHI and/or PV power estimates for use in management and control of power distribution networks in a cheaper and more efficient fashion than may be accomplished by related-art approaches. By learning the correlation between the cloud coverage and the total power variation at a distribution network substation, a low-bandwidth estimate of distributed PV production may be obtained. That information can be used in real time or near real time operation and control of a power distribution network by, for example, being transferred to the independent system operator or utility control center using existing supervisory control and data acquisition (SCADA) communication systems.

FIG. 1 is a conceptual diagram illustrating an example power distribution system (system 2) that includes a GHI/PV estimation device (estimation device 4) configured to estimate solar irradiance and/or PV across a geographic area using sky images, in accordance with one or more aspects of the present disclosure. In the example of FIG. 1, system 2 includes sky imaging device 3 and estimation device 4. Estimation device 4 includes GHI estimation module 6, PV estimation module 8, and management and control module 10. System 2 also includes substation 12, PV resources 14A and 14B (collectively "PV resources 14") and network devices 16A-16C (collectively "network devices 16").

System 2 includes a simplified representation of a power distribution network. In some examples, a power distribution network utilizing the techniques described herein may include any number of additional ones of PV resources 14, network devices 16, and/or other components. That is, while shown as having two PV resources and three network devices, in the example of FIG. 1, a power distribution network may include more or fewer PV resources, network devices, and/or other components in other examples. Additionally, FIG. 1 illustrates only one example of an estimation device configured to perform the techniques described herein, and various other systems may be used in accordance with the present disclosure. Furthermore, portions of or all of the techniques described herein may be utilized by devices other than as described with respect to FIG. 1. For example, the techniques of the present disclosure may, in various examples, be embodied in one or more devices within a power distribution network, including a distribution network management system, a microgrid management system, or other components of a power distribution network. In some examples, the techniques of the present disclosure may be embodied in a PV power plant system, or any other system or device that would benefit from GHI estimation or PV power output estimation as described herein.

Sky imaging device 3, as shown in the example of FIG. 1, represents a device capable of capturing images of a portion of a sky for a particular location. Sky imaging device 3 may capture visible light and/or other spectra. One real-world example of sky imaging device 3 is the Total Sky Imager Model TSI-880, made by Yankee Environmental Systems, INC of Turner Falls, Mass. USA. It is an automatic, full-color sky imager system that provides real-time processing and display of daytime sky conditions.

In the example of FIG. 1, sky imaging device 3 may capture sky images (e.g., one image per 10 s, one image per minute, one image per 10 minutes, etc.) and provide the sky images to estimation device 4. In order to estimate PV power output as described herein, the sky images may correspond to a geographic area that include a substantial portion of a power distribution network. For instance, in some examples, sky imaging device 3 may be substantially collocated with substation 12 and capture a portion of sky that includes the power distribution network illustrated in FIG. 1. In some examples, sky imaging device 3 may be located at other locations.

Estimation device 4, as shown in the example of FIG. 1, represents a system configured to estimate GHI and/or PV power output values in accordance with the techniques described herein. In some examples, estimation device 4 may be owned and operated by a utility company. In other examples, estimation device 4 may be owned and/or operated by another entity. For instance, estimation device 4 may be part of a PV generation system in a solar power plant or home solar system. In other words, estimation device 4 may represent any device or system configured to estimate GHI and/or PV power output as described herein.

Estimation device 4 may be a computing device, such as a server computer, a desktop computer, or any other device including a processor and capable of implementing some or all of the techniques described herein. In some examples, estimation device 4 may represent a cloud computing environment. That is, while shown as a single component in the example of FIG. 1, estimation device 4 may, in other examples, be a group of distributed computing resources that communicate with one another.

As shown in the example of FIG. 1, estimation device 4 includes GHI estimation module 6, PV estimation module 8, and management and control module 10. GHI estimation module 6 and PV estimation module 8 may represent a combination of software and/or firmware and hardware that is configured to estimate GHI values and PV power output values, respectively, in accordance with the techniques described herein. Management and control module 10 may represent a combination of software and/or firmware and hardware that is configured to cause one or more devices within the power distribution network of system 2 to modify operation based on estimated GHI values and/or estimated PV power output values.

In the example of FIG. 1, substation 12 represents the power distribution network substation and distribution network management system. That is, substation 12 may be or may include computing resources configured to manage a power distribution network to provide power to customers. For example, the power distribution network shown in FIG. 1 may be connected to a power transmission network (not shown). Substation 12 may manage the receipt and distribution of power from the transmission network while avoiding overloading the power distribution network and ensuring that customers' power needs are met.

In the example of FIG. 1, network devices 16 represent electrical components within the power distribution network that are operable to modify their operation. Examples of network devices 16 include power generation sources, power inverters (e.g., that connect PV or other generation sources to the network), controllable loads (e.g., energy storage systems, industrial equipment, etc.), connection devices (e.g., switching gear, etc.), curtailable loads, and any other equipment that may be operated to manage a power network.

In accordance with the techniques described herein, estimation device 4 may determine, based on a sky image of a portion of sky, using a convolutional neural network (CNN)-based image regression model, an estimated global horizontal irradiance (GHI) value. For example, GHI estimation module 6 of estimation device 4 may receive sky images from sky imaging device 3 and process each sky image in real time or near real time using a CNN-based image regression model to obtain estimated GHI values corresponding to the geographic location at which sky imaging device 3 is located. GHI estimation module 6 may provide the estimated GHI values to one or more other modules of estimation device 4. For example, GHI estimation module 6 may provide the estimated GHI value management and control module 10 for use in controlling a power distribution network and/or to PV estimation module 8 for further processing.

Estimation device 4 may determine, using a model correlating local PV generation with solar irradiance (e.g., GHI) values, a respective estimated PV power output value. For example, the model may be a Bayesian Structural Time Series (BSTS) model generated using power consumption information from substation 12 (or another source) and corresponding solar irradiance values. The model may use the local solar irradiance measurements to disaggregate summed PV generation and gross load signals at a downstream measurement site. PV estimation module 8 may utilize the model to predict PV power output values based on inputted GHI values.

Typical images from a sky imaging device cover approximately 10 km$^2$. This is well-aligned with the distribution system footprint of most substations. Thus, when sky imaging device 3 is collocated with substation 12, the total sky that is captured in an image may depict the cloud cover that is imposed on all (or substantially all) distribution circuits within the power distribution network. The cloud coverage at one time may shade PV systems in particular locations along the circuit (e.g., PV resource 14A), and this is then reflected in the change of total power measurement at substation 12. An image taken in a subsequent time step is correlated with another total power measurement and shows the cloud coverage at different locations along the circuit (e.g., PV resource 14B). Advanced data analytics are used to evaluate the variations and correlations in these measurements over time.

Estimation device 4 may cause at least one device in a power distribution network to modify operation based on the estimated GHI values and/or the estimated PV power output values. For instance, management and control module 10 may cause one or more of network devices 16 to modify operation based on the estimated GHI values generated by GHI estimation module 6 and/or on the estimated PV power output values generated by PV estimation module 8.

In some examples, estimation device 4 may directly control power distribution network devices. For example, management and control module 10 may generate instructions (e.g., power setpoint instructions, switching instructions, etc.) based on the estimated GHI values and/or estimated PV power output values and output such instructions for use by network devices 16. In some examples, estimation device 4 may cause network devices 16 to modify operation in other ways. For example, management and control module 10 may transmit estimated GHI values and/or estimated PV power output values to another system (e.g., substation 12) that is responsible for managing network devices 16.

While shown in the example of FIG. 1 as including both GHI estimation module 6 and PV estimation module 8, estimation device 4 may, in some examples, only include one or other. For instance, estimation device 4 may only include GHI estimation module 6 and thus cause devices in the power distribution network to modify operation based on the estimated GHI values. In other examples, estimation device 4 may only include PV estimation module 6. In such example, estimation device 4 may receive estimated or measured GHI values from some other source and may determine estimated PV power output values based on the received GHI values and received sky images. In other words, portions of the techniques described herein may be combined into one system or device, may be performed separately by two or more systems or devices, or may be used on their own.

In some examples, estimation device 4 and sky imaging device 3 may be a single device. That is, while shown as separate components in the example of FIG. 1, estimation device 4 and sky imaging device 3 may, in other examples, be combined in a single housing or device, capable of determining GHI measurements and/or determining estimated PV output in a "plug and play" fashion. Further details of estimation device 4 are provided below.

Figure 2:
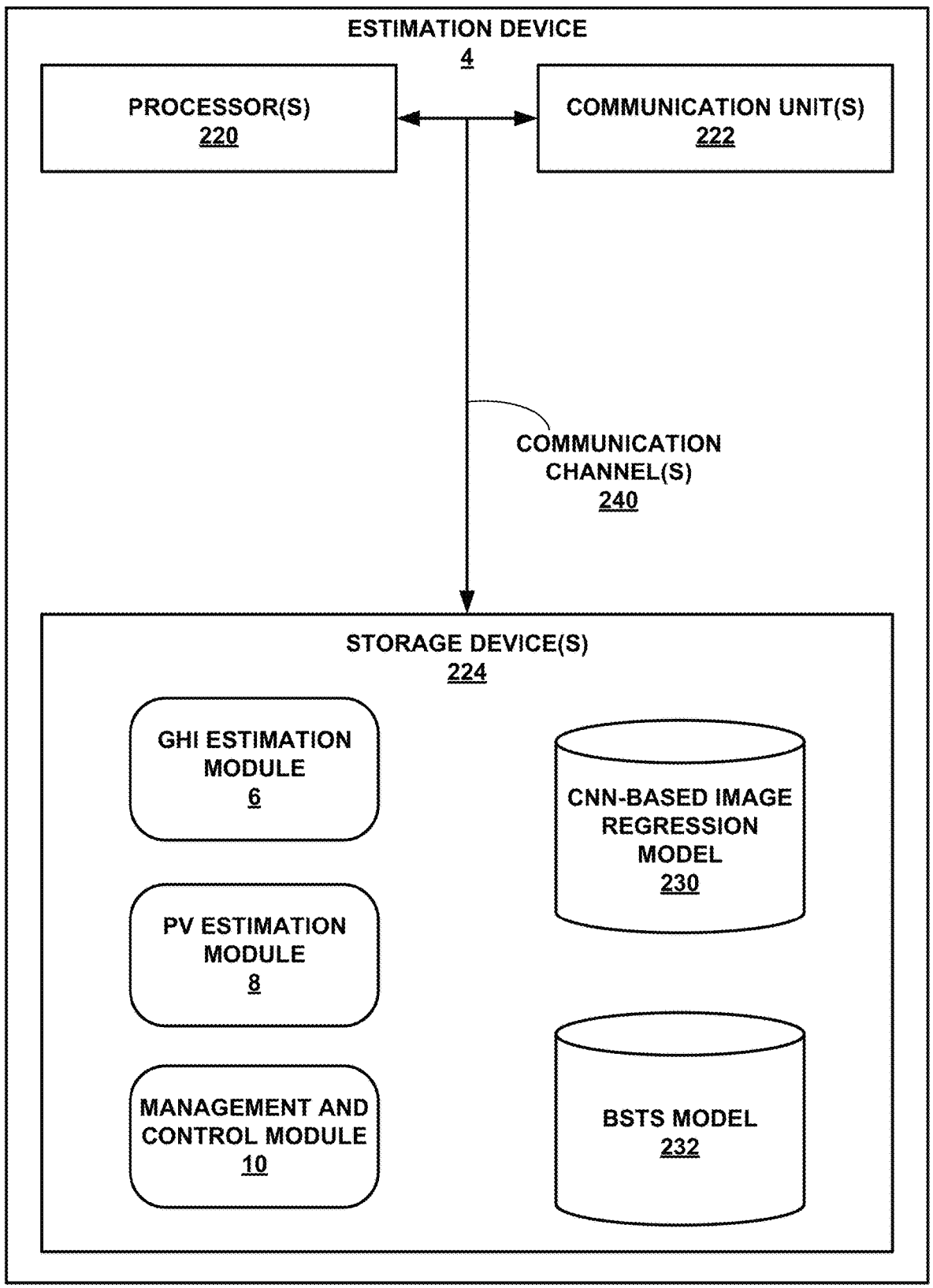
FIG. 2 is a block diagram illustrating additional details of a GHI/PV estimation device configured to estimate solar irradiance and/or PV across a geographic area using sky images, in accordance with one or more aspects of the present disclosure.

FIG. 2 is a block diagram illustrating additional details of estimation device 4, in accordance with one or more aspects of the present disclosure. The example of FIG. 2 is described below within the context of FIG. 1. FIG. 2 illustrates only one particular example of an estimation device configured in accordance with the techniques described herein. Other examples of an estimation device may be used in other instances. In some examples, estimation devices may include fewer components than shown in the example of FIG. 2 or may include additional or different components not shown in the example of FIG. 2.

In the example of FIG. 2, estimation device 4 includes one or more processors (processors 220), one or more communications units (communications units 222) and one or more storage devices (storage devices 224). Storage devices 224 of estimation device 4 include GHI estimation module 6, PV estimation module 8, and management and control module 10. Storage devices 224 also include CNN-based image regression model 230 and Bayesian structural time series model 232 ("BSTS model 232"). Communications channels 240 may interconnect each of components 220, 222, 224, 6, 8, 10, 230, and 232 for inter-component communications (physically, communicatively, and/or operatively). In some examples, communication channels 240 may include a system bus, a network connection, an inter-process communication data structure, or any other method for communicating data.

Communication units 222 may allow estimation device 4 to communicate with external devices via one or more networks by transmitting and/or receiving network signals on the one or more networks. For example, estimation device 4 may use communication units 222 to transmit and/or receive sky images from a sky imaging device (e.g., sky imaging device 3), power consumption data from a distribution network management system (e.g., substation 12), instructions to control devices in a power distribution network (e.g., network devices 16) or other information. In some examples, communication units 222 may be configured to communicate via a wired network. In some examples, communications units 222 may be configured to communicate via one or more wireless networks. Examples of communication units 222 include a modulator/demodulator (modem), a diplex filter, a communications processor, buffer memory, a network interface controller (e.g., an Ethernet card), an optical transceiver, a radio frequency transceiver, a GPS receiver, or any other type of device that can send and/or receive information. Additional examples of communication units 222 may include Bluetooth®, GPS, 3G, 4G, and Wi-Fi® radios, or Universal Serial Bus (USB) controllers.

Storage devices 224 may store information for processing during operation of estimation device 4. In some examples, storage devices 224 represent temporary memory, meaning that a primary purpose of storage devices 224 is not long-term storage. In some examples, storage devices 224 may be configured for short-term storage of information as volatile memory and therefore may not retain stored contents when powered off. Examples of volatile memories include random access memories (RAM), dynamic random access memories (DRAM), static random access memories (SRAM), and other forms of volatile memories known in the art.

In some examples, storage devices 224 may include one or more computer-readable storage media. That is, storage devices 224 may, in some examples, be configured to store larger amounts of information than volatile memory. Storage devices 224 may further be configured for long-term storage of information as non-volatile memory space and thus may retain information even when powered off. Examples of non-volatile memories include magnetic hard discs, optical discs, floppy discs, flash memories, or forms of electrically programmable memories (EPROM) or electrically erasable and programmable (EEPROM) memories. Storage devices 224 may store program instructions and/or data associated with modules 6, 8, and 10. Storage devices 224 may also store data representing CNN-based image regression model 230 and BSTS model 232.

CNN-based image regression model 230 is constructed using a convolutional neural network trained on sky images and corresponding GHI values. CNN-based image regression model 230 represents a relationship between sky images and solar radiation and can be used to estimate a GHI given an inputted sky image. To process the two-dimensional sky images (i.e., height and width), CNN-based image regression model 230 includes a two-dimensional backward propagation CNN. Further details of CNN-based image regression model 230 and its use by GHI estimation module 6 are described below.

BSTS model 232 represents a computer model configured to receive, as input, measured or estimated irradiance values (e.g., GHI values) and aggregate (net) load information for a power distribution network, and output estimated PV generation for the power distribution network. In some examples, BSTS model 232 may also receive temperature values. BSTS model 232 may be generated based on aggregate power consumption values (e.g., from substation 12) and corresponding GHI values (either estimated or measured). BSTS models are a highly expressive model class that blends classic time series models with the powerful Bayesian state space estimation framework. State-space models distinguish between a state equation that describes the transition of a set of latent variables from one time point to the next and an observation equation that specifies how a given system state translates into measurements. The BSTS model is particularly useful, as it's able to capture time evolution of state variables. Disaggregation is done probabilistically, which automatically quantifies the uncertainties of the estimated PV generation and gross load consumption. Further details of BSTS model 232 and its use by PV estimation module 8 are described below.

One or more of processors 220 may implement functionality and/or execute instructions within estimation device 4. For example, processors 220 of estimation device 4 may receive and execute instructions stored by storage devices 224, thereby enabling the functionality of modules 6, 8, and/or 10. In some examples, the execution of these instructions, by processors 220, may cause estimation device 4 to store information within storage devices 224 during program execution. Modules 6, 8, and 10 may be operable by processors 220 to perform various actions, including estimating GHI and PV power output values and causing power distribution network devices to modify operation based thereon.

In accordance with aspects of the present disclosure, GHI estimation module 6 may be executable by processors 220 to generate and/or utilize CNN-based image regression model 230. GHI estimation module 6 may utilize CNN-based image regression model 230 to determine, based on a sky image of a portion of sky, an estimated GHI value. For instance, GHI estimation module 6 may receive (e.g., from communications units 222) a sky image captured by sky imaging device 3 and provide the sky image as input to CNN-based image regression model 230. GHI estimation module 6 may provide, as output, the estimated GHI value.

In accordance with aspects of the present disclosure, PV estimation module 8 may be executable by processors 220 to determine, based on a solar irradiance value, using a BSTS model that correlates local PV generation with solar irradiance values, a respective estimated PV power output value. In some examples, PV estimation module 8 may receive (e.g., from communications units 222) an estimated GHI value from GHI estimation module 6. In some examples, such as when estimation device 4 does not include GHI estimation module 6, PV estimation module 8 may receive a measured GHI or other solar irradiance value, such as from an irradiance sensor or other device. Based at least in part on the received irradiance value, and using BSTS model 232, PV estimation module 8 may determine an estimated PV value for the power network. In some examples, temperature information may also be utilized to provide the estimated PV value.

By leveraging low cost sky imaging devices and existing substation measurement data from a SCADA system, the techniques described herein can be readily integrated into existing monitoring and control systems. Advanced data analytics methods are used to learn the correlation between cloud coverage and solar irradiance at multiple locations from sky images, avoiding the need for multiple sensors and additional infrastructure. Combining the use of a sky imaging device with power system information available at the substations allows utilities to quickly determine GHI and/or PV output in distribution circuits and also enable better real time control and optimization of individual circuits.

While described with respect to GHI estimation using sky images, such a CNN-based approach could be extended for use in various other regression problems. For example, the techniques of the present disclosure may be used as an automatic and multi-functional platform for other image regression projects, such as tidal and geothermal power estimation.

Further details of generating and training a CNN-based image regression model (e.g., model 230) and its use (e.g., by GHI estimation module 6) are now provided. The general problem can be stated as the need to build a mapping between inputted sky images and corresponding GHI values. However, solar irradiation is a continuous variable with a relatively large rage, and thus the classification of solar irradiation can involve large amounts of error and deviation.

In order to train a CNN-based image regression model to be reliable and robust, accurate training data is necessary. Thus, data cleaning is an important component of the machine learning process. Various processes and methods of data cleaning may be used to prepare GHI data and sky image data for training. Examples of data cleaning include data merging, data calibration, missing data recovery, data normalization, anomaly detection, data standardization, data verification and mapping, and others. In some examples, data cleaning may utilize additional information to accurately preprocess data, such as temperature values, Zenith angle values, and other information.

After cleaning the data, the sky images and GHI values in the training data should have a one-to-one correspondence. An input space $X=\{x_1, \ldots, x_{N_1}\}$ may represent the sky images. Each sky image may be a three-dimensional matrix of values (e.g., denoting red, green, and blue color values) and $x_i$ may denote the i-th sky image. The corresponding output space $\mathcal{Y}=\{y_1, \ldots, y_{N_1}\}$ may represent the GHI values, where $y_i$ denotes the i-th GHI value. Given the training samples $D=\{x_i, y_i\}_{i=1}^{N_1}$, the CNN-based image regression techniques described herein finds a mapping from images to GHI values $h(\bullet)$: $X \rightarrow \mathcal{Y}$ with a predefined cost function $C: X \times \mathcal{Y} \mapsto R$.

During training, the cost function $C(h)$ can be minimized with several different approaches, including stochastic gradient descent (SGD), momentum, and Nesterov momentum. The techniques described herein apply Adaptive Moment Estimation (ADAM). Different from related-art optimization techniques, in machine learning, the distribution of the training space is usually different from the distribution in the testing space, which requires a good generalization characteristic for the selected $h(\bullet)$. Using such related-art optimization approaches without any revision during the training could cause several problems, such as ill-condition, local minimum, cliffs, etc., which can dramatically damage the testing performance. There are, however, several basic methods such as early stopping, parameters/hyperparameters initialization, and adaptive learning that will address such issues.

The cleaned-up sky image data may be separated into categories based on the number of okta (a measurement of cloud cover) in each image. For example, sky images may be sorted into four categories, one containing sky images with only one or two okta, one containing sky images with three or four okta, one containing sky images with five or six okta, and one containing seven or eight okta.

Figure 3A:
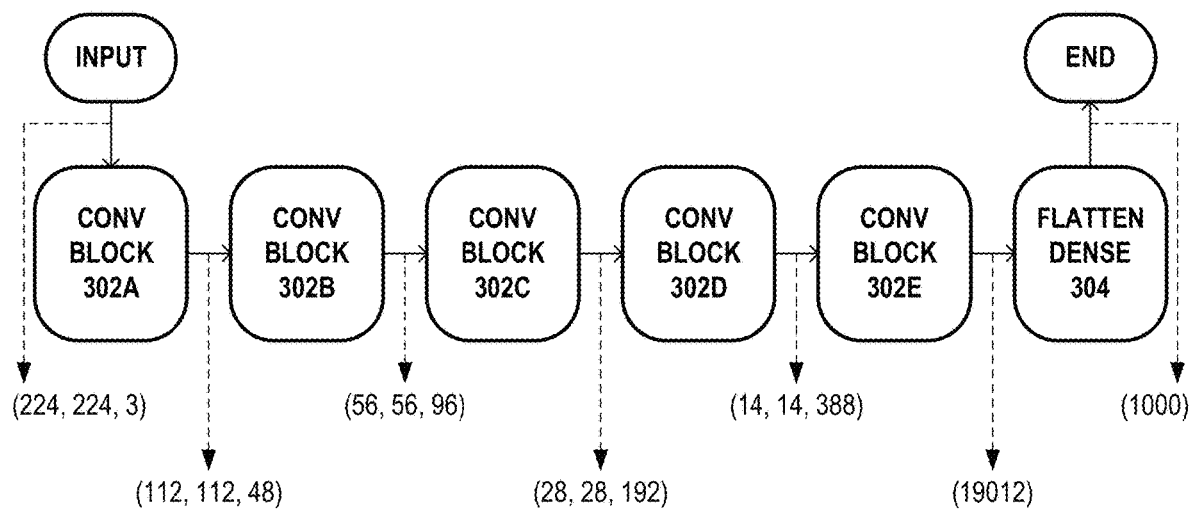
FIGS. 3A and 3B are conceptual diagrams illustrating an example CNN-based image regression model for estimating solar irradiance across a geographic area using sky images, in accordance with one or more aspects of the present disclosure.
Figure 3B:
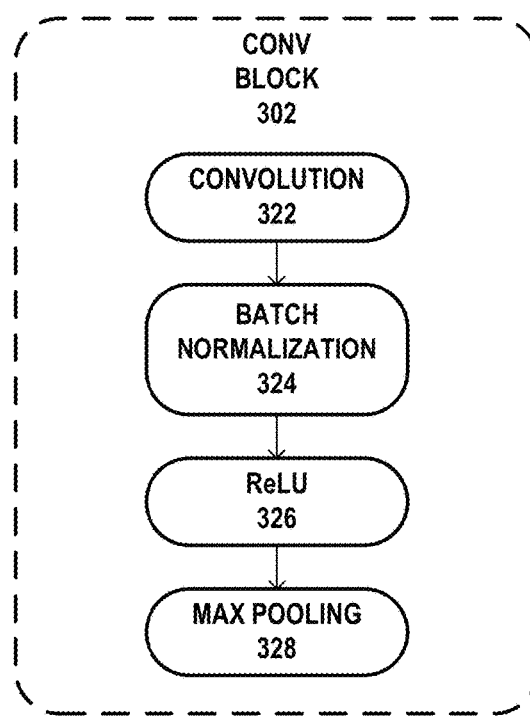

FIGS. 3A and 3B are conceptual diagrams illustrating an example CNN-based image regression model (CNN 300) for estimating solar irradiance across a geographic area using sky images, in accordance with one or more aspects of the present disclosure. As shown in the example of FIG. 3A, CNN 300 includes convolutional blocks 302A-302E ("cony block")—which are collectively referred to herein as convolutional blocks 302—and flattening/densifying block 304 ("flatten dense"). As shown in FIG. 3B, each of convolutional blocks 302 includes convolution layer 322, batch normalization 324, rectified linear unit ("ReLU") 326, and max pooling 328.

The first part of each of convolutional blocks 302 is convolution layer 322. Convolution layer 322 implements a 3*3 perception field to increase the nonlinear characteristics and reduce the computation load. The stride step is set as 1 and padding is also set as 1, which keeps the size of the sky image for next block processing.

The second part of each of convolutional blocks 302 is batch normalization 324. Batch normalization 324 aims to solve the internal covariance shift. With the increasing layers of a CNN, the distribution of the inputs changes gradually, which can cause the CNN to be unstable and very difficult to train. By including batch normalization 324, the unwanted distribution shift can be reduced, the training speed can be increased, and CNN 300 is more stable.

The third part of each of convolutional blocks 302 is ReLU 326. ReLU 326 may represent the activation function and may bring nonlinear characteristics to CNN 300. Compared with other activation functions such as sigmoid, hyberbolic tangenet, and Gaussian, the ReLU function is more convenient to compute the derivative. It also has fewer vanishing gradients, and fewer saturate parts. Specifically, in CNN 300, as shown in the example of FIGS. 3A and 3B, the target is solar irradiance values, which means all the outputs should be positive real numbers. The ReLU function can meet this requirement.

The final part of each of convolutional blocks 302 is max pooling 328. In the example of FIGS. 3A and 3B, max pooling 328 is based on the VGG 16 architecture and designed as 2*2 with stride 2*2, which selects the maximum value over the 2*2 portion. Max pooling 328 may represent a down-sampling operation, which selects the feature of the 2*2 and non-overlapping area, reduces the dimensionality of the input, and passes the selected features to the next convolution block.

The parameter set for each of convolutional blocks 302, as shown in FIG. 3A, indicates the output dimension of the relevant convolutional block. For example, (112, 112, 48) is 112*112, and 48 indicates there are 48 feature maps (or feature images). This means the features can be selected in different feature maps, which provide a more convenient way for feature extraction.

After convolutional blocks 302, the dimensions of the input image have been changed from 224*224*3=150,528 to 7*7*388=19,012, which means only 12.63% of the data can represent the features of the original image. Flattening/densifying block 304 flattens the output from convolutional block 302E into a vector and acts as an input for the fully connected layer with 1000 neurons for the final regression.

With regard to the learning of CNN 300, the last layer usually uses the softmax activation function and cross entropy as the objective function in classification problems. However, considering the regression objective of the techniques described herein, the mean-square-error function may be employed as the objective function, and a linear function may be used as an activation function. I.e.:

$$E = \frac{1}{2}(g_{final}(X_1^m) - y)^2 + reg_{l2} \quad (1)$$

where $g_{final}$ is the activation function, which is ReLU as described in the example of FIGS. 3A and 3B, $X_1^m$ is the only one output in last layer m, y is a general form of the GHI value, and $reg_{l2}$ is a weighted L2 regularization item—the elastic (combined L1 and L2) could also be implemented here—and E is the loss. Then the error can be derived as:

$$\delta_1^m \equiv \frac{\delta E}{\delta \chi_1^m} = (g_{final}(\chi_1^m) - y) g'_{final}(\chi_1^m) \quad (2)$$

where the derivative of ReLU is $$g'_{final}(\chi_1^m) = \begin{cases} 1, & \text{if } \chi_1^m > 1 \\ 0, & \text{otherwise} \end{cases}. \quad (3)$$

In the hidden layer, the error item can be derived as follows:

$$\delta_j^k = g'(X_j^k) \Sigma_{l=1} w_{jl}^{k+1} \delta_l^{k+1} \quad (4)$$

where k+1 indicates the layer, $\delta^k$ is the error in last layer k, and $w_{jl}^{k+1}$ is a weight for node j for incoming node l in layer k+1. The weight can be derived as:

$$\frac{\partial E}{\partial w_{i,j}^k} = o_i^{k-1} g'(\chi_j^k) \sum_{l=1}^{r^{k+1}} w_{jl}^{k+1} \delta_l^{k+1} \quad (5)$$

where $o_i^{k-1}$ is the output for node i in layer k, and r is the total number for node l.

The techniques described herein utilize CNN to build a mapping between sky images and GHI values, which requires an extension from 1-dimensional backward propagation to 2-dimensional backward propagation. The weight can be computed as $$\frac{\partial E}{\partial w_{m',n'}^k} = \sum_{i_1=0}^{H_1-k_1} \sum_{j_1=1}^{W_1-k_2} \delta_{i_1,j_1}^k o_{i_1+m',j_1+n'}^{k-1} = \overline{\delta_{i,j}^k} * o_{m',n'}^{k-1} \quad (6)$$

where * indicates a 2-dimensional ($H_1$ and $W_1$ indicates the height and width of the sky image) convolution in CNN, $k_1 \times k_2$ is the dimension of the filter, and $\overline{\delta_{i,j}^k}$ indicates the flipped kernel. $\delta$ and o are the same as defined above.

Then, similar to equation (2), the error can be computed as:

$$\frac{\partial E}{\partial \chi_{i',j'}^k} = \sum_{m=0}^{k_1-1} \sum_{n=0}^{k_2-1} \delta_{i'-m,j'-n}^{k+1} w_{m,n}^{k+1} f'(\chi_{i',j'}^k) \quad (7)$$

where X is defined as:

$$X_{i_1,j_1}^k = \Sigma_m \Sigma_n w_{m,n}^l o_{i_1+m,j_1+n}^{k-1} + b_{i_1,j_1}^k \quad (8)$$

where $b_{i_1,j_1}^k$ is the bias for node with position $i_1,j_1$ in layer k. This, in sum, provides the 2-dimensional CNN formulated for sky image processing as described herein.

As a concrete example, a CNN-based image regression model was configured and trained in accordance with the techniques described herein. Training was based on three months of GHI and sky image data obtained from the Solar Radiation Research Laboratory at the National Renewable Energy Laboratory in Golden, Colo. The sampling rate of the sky imaging device was 1 sample per minute from sunrise to sunset each day. The sampling rate of the GHI measurement device was also 1 sample per minute for 24 hours per day. The data was preprocessed to detect and eliminate anomalies.

Figure 4A:
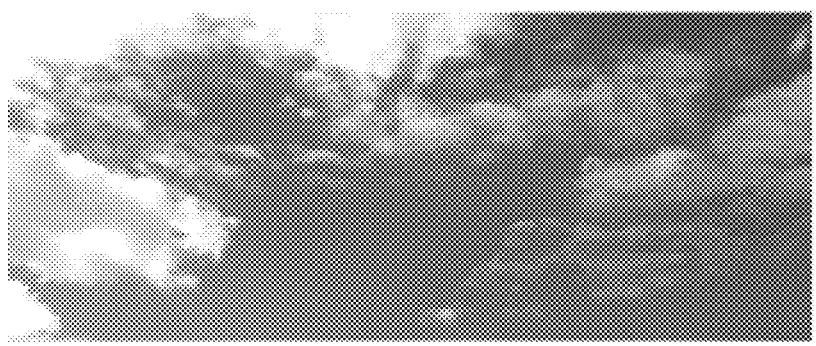
FIGS. 4A-4E are photographs illustrating operation of an example CNN for estimating solar irradiance across a geographic area using sky images, in accordance with one or more aspects of the present disclosure.
Figure 4B:
Figure 4C:
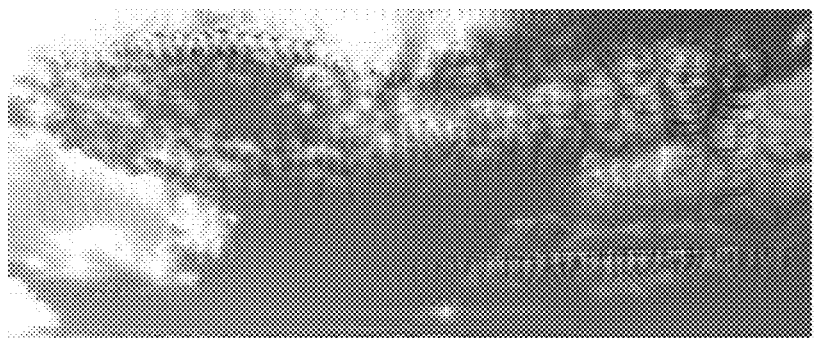
Figure 4D:
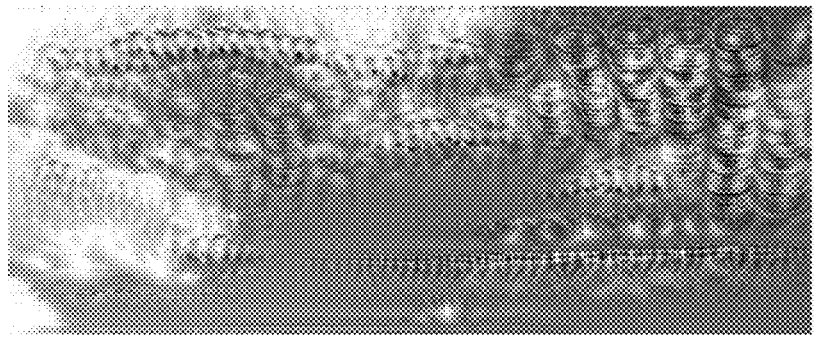
Figure 4E:
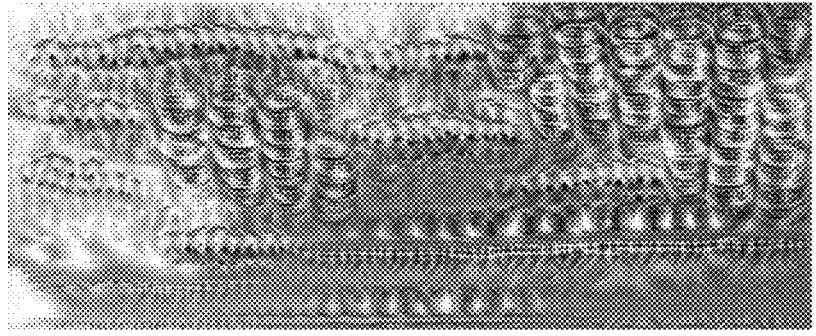

With the limitation of computer memory (e.g., 64 GB) in mind, the data of 1, 2, 3, 4, and 5 days were separately used as training data, and 70 randomly selected sky images and corresponding GHI values were used as testing data. As described herein, the techniques of the present disclosure build a mapping relationship from images to GHI values $h(\bullet): X \mapsto \mathcal{Y}$ FIGS. 4A-4E are photographs illustrating operation of an example CNN-based image regression model for estimating solar irradiance across a geographic area using sky images, in accordance with one or more aspects of the present disclosure. FIGS. 4A-4E are described herein with respect to CNN 300 of FIGS. 3A and 3B. FIG. 4A represents a photograph of a partly cloudy sky, as extracted from the beginning of CNN 300. FIG. 4B represents the feature extraction obtained after convolutional block 302A of CNN 300. FIG. 4C represents the feature extraction obtained after convolutional block 302B of CNN 300. FIG. 4D represents the feature extraction obtained after convolutional block 302C of CNN 300. FIG. 4E represents the feature extraction obtained after convolutional block 302D of CNN 300.

As seen in FIGS. 4A-4E, there is little extraction after the first convolutional block. That is, FIG. 4B is almost the same as FIG. 4A. However, the small crinkles indicating the feature and edges of the clouds are extracted by the CNN. In FIG. 4C, it is clear that the edges of the clouds are selected by the crinkles, which means the features of the major parts are identified and located in the image. In FIGS. 4D and 4E, the features of the smaller parts are also identified and located. In brief, with deeper layers in the CNN, more and more features are gradually extracted. With the extracted features, the regression analysis is performed.

Figure 5A:
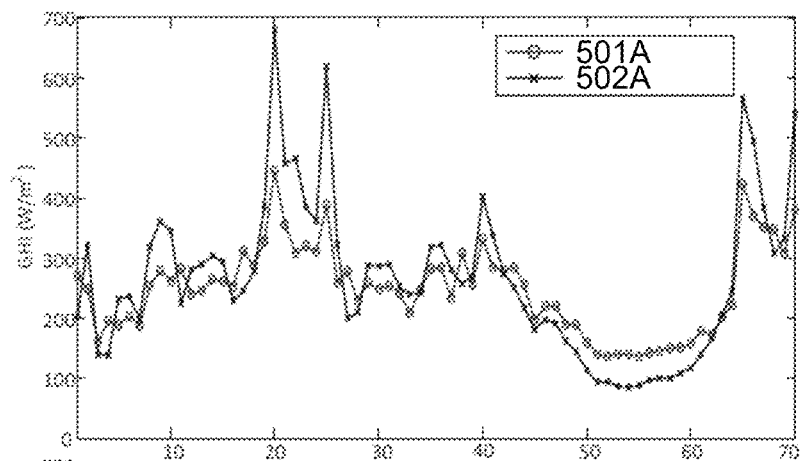
FIGS. 5A-5C are graphical plots illustrating the results obtained by using example CNN-based image regression models for estimating solar irradiance across a geographic area using sky images, in accordance with one or more aspects of the present disclosure.
Figure 5B:
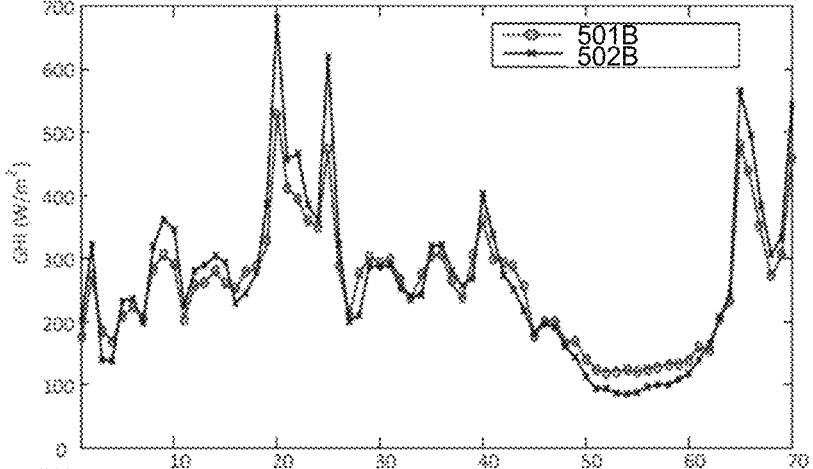
Figure 5C:
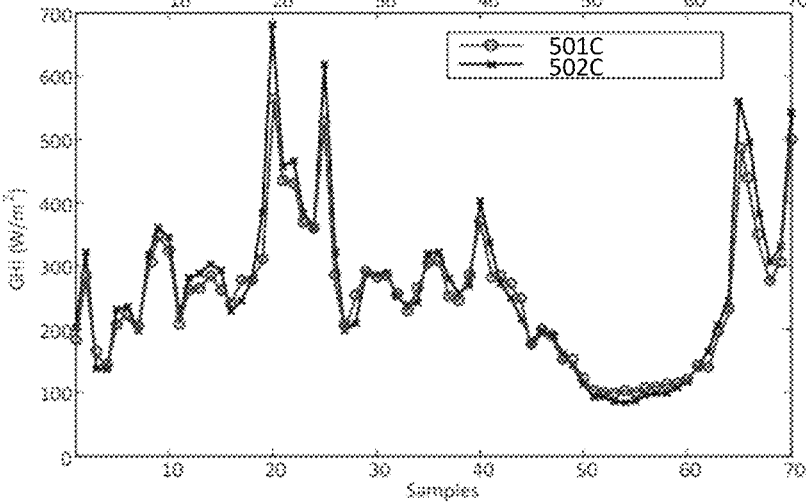

FIGS. 5A-5C are graphical plots illustrating the results obtained by using example CNN-based image regression models for estimating solar irradiance across a geographic area using sky images, in accordance with one or more aspects of the present disclosure. Specifically, FIG. 5A represents the results obtained from using a CNN-based image regression model trained with a single day of training data, FIG. 5B represents the results obtained from using a CNN-based image regression model trained with three days of training data, and FIG. 5C represents the results obtained from using a CNN-based image regression model trained with five days of training data. The image regression results of the trained CNN-based image regression models are represented by lines 501A, 501B, and 501C (using circles) in FIGS. 5A-5C, respectively. The true values are represented by lines 502A, 502B, and 502C (using exes) in FIGS. 5A-5C.

As can be seen, the results obtained using a CNN-based image regression model trained with only one day of data contain relatively large errors. Specifically, as shown by line 501B, there are 4 peaks located in samples 20, 25, 65, and 70, which indicate high solar irradiance. However, with 1-day training data, the results of the proposed approach (line 501A) are much lower, which indicates a mismatch between the CNN's results and the measured data. In addition, in the samples between 45 to 65, there is a large valley in the testing GHI values. The CNN-based image regression model also fails to accurately track these measured GHI values. In FIG. 5A, the mean absolute percentage error (MAPE) is 21.8%, which implies that a single day of training data is not sufficient to achieve an acceptable result.

Compared with FIG. 5A, the results presented in FIGS. 5B and 5C, with 3 and 5 days of training data, respectively, contain smaller errors. In FIG. 5B, it is obvious that the peak errors in samples 20, 25, 65, and 70 are much smaller than in FIG. 5A, and the valley errors from samples 45 to 65 are also smaller than in FIG. 5A. In FIG. 5C, the peak errors and valley errors are very small, and lines 501C and 502C are almost identical in the rest of the samples. This would imply that five days of training data enables the CNN-based image regression model to provide very accurate image regression results for solar irradiance. The MAPE for the results shown in FIGS. 5B and 5C are 12.6% and 8.1%, respectively, which clearly shows that at this level, the regression error decreases with increased training data length.

The techniques of the present disclosure focus on the use of sky images taken with visible light for solar irradiance and PV estimation. However, other images, such as 10-12 μm normalization radiance and RB ratio mask also contain useful information and can be treated as good alternative/additional information for the image regression techniques described herein. Furthermore, in addition to Zenith angle and temperature, other parameters, such as humidity, air condition, and solar periods can also be used as assistive inputs in the described techniques.

The techniques of the present disclosure provide a number of advantages over related-art solar irradiance capture approaches. As one advantage, the techniques described herein do not require expensive, high-resolution images such as those captured by geostationary satellites. Rather, the cost of the described techniques is much lower and thus the described techniques are much easier to implement. As another advantage, the techniques described herein provide an end-to-end solution for capturing solar irradiance values. This not only reduces information loss between, e.g., feature engineering and regression processing, but also improves the learning efficiency of the CNN-based image regression model. Furthermore, as described herein, the image regression techniques of the present disclosure can be easily extended to PV output regression and/or power system stability forecasting, which is a significant interest of power distribution network operators.

Further details of generating and training a BSTS model (e.g., model 232) and its use (e.g., by PV estimation module 8) are now provided. The overarching problem is that most distributed photovoltaic (PV) generation occurs "behind the meter". A power distribution system operator can only observe the net load, which is the sum of the gross load and any distributed PV generation. This lack of observability poses a challenge to system operation at both bulk level and distribution level. The lack of real-time or near-future disaggregated estimates of gross load and PV generation could lead to over scheduling of energy production and regulation reserves, reliability constraints violations, wear and tear of controller devices, and potentially cascading failures of a power system. To address this need, a BSTS model can be used with local solar irradiance values to disaggregate the summed PV generation and gross load signals at a downstream measurement site. BSTSs are a highly expressive model class that blends classic time series models with the powerful Bayesian state space estimation framework. Disaggregation is done probabilistically, which automatically quantifies the uncertainties of the estimated PV generation and gross load consumption.

The BSTS model described herein represents a probabilistic model using high-performing fitting algorithms. To create the BSTS model, a synthetic state space model is constructed. The synthetic state space model is designed so that it has a structural similarity to classic time series models (e.g., the AR/I/MA class of models). This methodology fundamentally differs from related-art unsupervised approaches by providing probabilistic estimation of PV generation and gross load consumption. Instead of producing a deterministic or "point" estimate of the disaggregated signals, the BSTS model defines a joint probability density function (PDF) over the gross load and PV generation at each time point, and the dispersion and covariance structure of the joint PDF automatically quantifies the uncertainties associated with the disaggregated PV and load signals.

In addition to quantifying uncertainty, the BSTS model described herein has the advantage of being robust to noise in the input data. The underlying methodology of BSTS disaggregation is to consider all possible disaggregated signal shapes, and weight them according to their plausibility with the model covariates and net load data. The BSTS approach therefore only makes significant changes to its estimates of PV and gross load when the input data exhibit a change large enough to alter the plausibility of a substantial range of potential disaggregations, reflecting real changes in the system.

These features of the BSTS model can improve the efficiency of distribution system operations. The joint PDF produced by the BSTS model described herein provides real-time bounds for gross load and PV generation, and also accounts for correlation in the errors between the two quantities, allowing a power system operator to more precisely determine necessary reserve deployment. Furthermore, robustness in the disaggregation estimate helps prevent the operator from taking unnecessary control actions due to noise in the data.

As a concrete example of creating and using a BSTS model as described herein, Advanced Metering Infrastructure (AMI) data from Pecan Street Inc. Dataport was used. This data includes household-level power usage and PV generation data at a 1-minute time resolution for 123 houses in the Mueller neighborhood of Austin, Tex. The techniques described herein were tested on 7 days in January and August, 2017. As the BSTS model relies on local measurements of solar irradiance and ambient temperature to disaggregate PV generation (quantities highly correlated with PV and gross load), the Pecan Street data was supplemented with data from the National Solar Radiation Database (NSRDB). The NSRDB provides irradiance and climate data (temperature, humidity, etc.) at a 30-minute time resolution and a 4 km$^2$ spatial resolution. To create a synthetic distribution feeder, the household-level Pecan Street time series data was summed, and then the sum was down-sampled to 30-minute resolution, matching the NSRDB data. Line loss and other grid effects were not included in this feeder model.

To define the BSTS model used herein, let $P_t$ denote the observed, feeder-level net power consumption at time t, $S_t$ denote the downstream, distributed PV generation, and $L_t$ denote the gross load consumption. In addition, the solar irradiance metric is denoted as $\phi_t$, and the 1×m gross load covariate vector as $X_t$ (see below for an explanation of the temperature covariates). These evolving quantities are modeled as follows:

$$S_t = \beta_t \phi_t + \epsilon_t^{(s)}$$

$$\beta_t = \beta_{t-1} + \epsilon_t^{(\beta)}$$

$$L_t = X_t \gamma + L_{t-1} + \epsilon_t^{(l)}$$

$$P_t = S_t + L_t \quad (9)$$

where the random terms $\epsilon_t^{(\cdot)} \sim N(0, \sigma^2)$, which in the case of the terms $\epsilon_t^{(s)}$ and $\epsilon_t^{(l)}$ represents evolution in the gross load and PV generation not explained by their respective covariates.

Since the right-hand side of Eq. (9) is linear in the state variables, a "synthetic" state variable $y_t = [S_t, \beta_t, L_t, 1]^T$ can be defined, and then (9) can be rewritten into a state space model:

$$y_t = Z_t(\gamma) y_{t-1} + \omega_t$$

$$P_t = A y_t \quad (10)$$

where:

$$A^T = [1, 0, 1, 0] \quad (11)$$

$$Z_t(\gamma) = \begin{bmatrix} 0 & \phi_t & 0 & 0 \\ 0 & 1 & 0 & 0 \\ 0 & 0 & 1 & X_t\gamma \\ 0 & 0 & 0 & 1 \end{bmatrix}$$

$$\omega_t = \left[\epsilon_t^{(s)}, \epsilon_t^{(\beta)}, \epsilon_t^{(l)}, 0\right]^T$$

In addition to specifying the model structure as in (9) or (10), the Bayesian approach also requires setting prior distributions over all unknown parameters. The following priors are used herein:

$$S_1 \sim N(\mu_S, \Sigma_S^2)$$

$$\beta_1 \sim N(0, \Sigma_\beta^2)$$

$$L_1 \sim N(\mu_L, \Sigma_l)$$

$$\gamma \sim N(0, \Sigma_\gamma) \quad (12)$$

There are several options to handle the unknown $\Sigma^2$ in (12), as well as the $\delta^2$ from (9). As one example, the bsts package for the R statistical computing language assigns them empirically-derived, inverse-gamma priors and then estimates them simultaneously with the other unknown parameters. However, for simplicity of presentation they are treated herein as simply known.

The relationship between gross load and temperature was modelled using a lagged temperature model, which reflects that load commitments are often not due to instantaneous ambient temperature. Furthermore, model performance using lagged temperature demonstrated improvements over other temperature models used in previous model iterations which, for brevity, are not discussed here. To determine the appropriate temperature lags in the data of the concrete example, one day in both August and January was randomly designated as training data, and the remaining six days as testing data. All performance metrics were averaged over all such partitions of the training and testing data.

Given training temperature data $\tilde{T}_t$ and gross load $\tilde{L}_t$, temperature lags were determined using the cross-correlation function:

$$CC(k) = \mathcal{F}^{-1}[\mathcal{F}[\tilde{T}]^*(\omega) \mathcal{F}[\tilde{L}](\omega)](k) \quad (13)$$

where $\mathcal{F}$ is the Fourier transform. All timepoints $k_1, \ldots, k_m$ corresponding to the local maxima of $|CC(k)|$ were selected as lags for the model. Define the k-lag operator by:

$$L_k(T_t) = \begin{cases} 0, & t < k \\ T_{t-kr}, & t \geq k \end{cases}.$$

Then the covariate vector $X_t$ was defined as:

$$x_t = [L_{k_1}(T_t), \ldots, L_{k_m}(T_t)]$$

To fit the BSTS model, let $y = [y_1, \ldots, y_t]^T$ and $P = [P_1, \ldots, P_t]^T$ (with similar vectors defined for all other times series). Given the priors in (12), the joint posterior distribution over the state space can now be written as:

$$Pr[y, \gamma | P] \propto \mathcal{L}(P; y, \gamma) \pi[y, \gamma]$$

$$Pr[S, L, \beta, \delta, \gamma | P] \propto N(\mu_S, \Sigma_S^2) N(0, \Sigma_\beta^2) N(\mu_L, \Sigma_l^2) \times N(0, \Sigma_\gamma^2) \times \Pi_{t=1}^n [N(\beta_2 \phi_t, \sigma_S^2) N(\beta_{t-1}, \sigma_\beta^2) \times N(X_t^T \gamma + L_{t-1}, \sigma_L^2)] \quad (14)$$

To estimate the disaggregated S and L, marginalize over the state variables $\beta$ and $\gamma$:

$$[S, L | P] = \int [S, L, \beta, \gamma | P] d\beta d\delta d\gamma.$$

A point estimate of the disaggregated PV generation and true load can then be obtained by taking the expectation of the joint posterior over S and L:

$$(\hat{S}, \hat{L}) = E_{[S, L | P]}[S, L]$$

Uncertainty in this point estimate is represented by the dispersion of $[S, L | P]$ about the expectation. While there are a number of measures of dispersion, the most straightforward choice for this purpose (and the one used in this concrete example) is the p % probability region centered at the mode of $[S, L, \beta, \delta, \gamma | P]$ (i.e., the p % quantile region).

In practice, the functional form of Eq. (14) may be too complex to handle analytically. In such instance, Markov Chain Monte Carlo (MCMC) can be used to sample from it, and the empirical statistics of the samples (mean, quantiles, etc.) can be used as approximations of the true quantities. Given the model (10), MCMC can be performed using a generalization of the Kalman smoother found in the literature.

The performance of the BSTS model described herein was compared to the performance of five other related-art methods for disaggregation: the Contextually Supervised Generation Estimation (CSGE) model and four others, referred to herein as Models A-D. To fit the BSTS model, the sampling algorithm was iterated for $N = 10^5$ iterations, using the bsts package for the R statistical computing language. Burn-in length was estimated automatically by bsts. Fitting the comparison models was performed with the CVXOPT and SciPy Optimize packages for Python. All fitting was performed on a laptop computer (Intel Core i5-4300U with 16 GB of RAM). Posterior sampling for the BSTS model took approximately 6 minutes and 38 seconds. Fitting the CSGE model took 0.7 seconds, and fitting Models A-D took 0.08 to 82.1 seconds.

The performance of the six models under consideration was compared using the relative Root Mean Square Error (rRMSE). For an estimate $\hat{x}_t$ being compared to true values $x_t$, this is defined as:

$$rRMSE = \frac{\sqrt{\frac{1}{N}\sum_{t=1}^{N}(\hat{x}_t - x_t)^2}}{\max_t(|x_t|)} \qquad (15)$$

Each model's performance estimating PV generation and gross load is listed in Table I. For the BSTS model-based techniques described herein, rRMSE was averaged over all training/testing partitions. One can see that the BSTS model-based techniques achieve significantly lower rRMSE than other state-of-the-art methods, and that therefore on average it estimates PV and gross load more closely than the optimization methods. While in January the BSTS model performs only slightly better than CSGE at estimating true PV, it performs substantially better at estimating gross load than any other method.

TABLE I

Disaggregation Performance for January and August Datasets

| Model | $S_t$ rRMSE (Jan) | $S_t$ rRMSE (Aug) |
|---|---|---|
| BSTS | 5.37% | 9.74% |
| CSGE | 6.75% | 22.36% |
| Model A | 11.54% | 15.93% |
| Model B | 10.41% | 15.80% |
| Model C | 10.52% | 18.54% |
| Model D | 12.07% | 15.70% |
| | $L_t$ rRMSE (Jan) | $L_t$ rRMSE (Aug) |
| BSTS | 11.77% | 9.40% |
| CSGE | 18.43% | 21.53% |
| Model A | 24.88% | 15.25% |
| Model B | 24.48% | 15.17% |
| Model C | 24.01% | 30.07% |
| Model D | 26.02% | 15.04% |

In addition to these metrics, which are valid for all considered models, the performance of the BSTS model-based estimates were also assessed using metrics which are only defined for probabilistic estimates. Specifically, the Prediction Interval Coverage Probability (PICP) was used, which is defined as:

$$PINAW = \frac{1}{NW}\sum_{t=1}^{T}(U_t - L_t) \qquad (17)$$

where $1_t$ is an indicator variable which is 1 when the target variable is within the bounds of the prediction interval (in the concrete example case, the 95% quantile of the posterior density), and 0 otherwise. Since the BSTS model assumes that PV generation is strongly determined by GHI, when GHI=0 the prediction interval collapses and so PICP for these times did not accurately reflect model performance. Therefore, the PICP was calculated using all time-points as well as using only time-points where GHI was greater than zero (i.e., the daytime), which gives a better picture of model accuracy.

While the PICP is determined by prediction accuracy, it also depends on the choice of prediction interval width. By choosing an especially wide interval, PICP can be increased, without a concurrent increase in model performance. Therefore, the PICP was paired with the Prediction Interval Normalized Average Width (PINAW), which measures the interval width of the estimates. It is defined as:

$$PICP = \frac{1}{N}\sum_{t=1}^{T}1_t \qquad (16)$$

where W is the range of the target variable, and $U_t$ and $L_t$ are the prediction upper and lower bounds at time t. When the PICP is near 1 (high accuracy) and the PINAW is near 0 (high precision) it implies that a method is performing very well.

The performance of the BSTS model, configured in accordance with the techniques described herein, in terms of these probabilistic metrics is given in Table II. The daytime PICP indicates that the chosen 95% prediction intervals contain the true value only about 50-75% of the time, despite being wide relative to the scale of the data. This suggests that the BSTS model may be overconfident, which is a common problem with Kalman Filters when the underlying model doesn't fully capture the true dynamics of the data. It can be seen that this problem is worse for the January data, where the load model seems structurally unable to capture an unusual mid-day reduction in gross load. This issue can easily be improved by further developing the model to more faithfully track load dynamics, for example by leveraging reactive power measurements, voltage and current measurements, and other relevant available information.

TABLE II

BSTS Calibration and Precision by Target Variable

| Metric | $S_t$ (Jan) | $L_t$ (Jan) | $S_t$ (Aug) | $L_t$ (Aug) |
|---|---|---|---|---|
| PICP | 24.41% | 78.08% | 44.96% | 85.50% |
| PICP, daytime | 53.41% | 52.84% | 77.30% | 76.40% |
| PINAW | 5.89% | 21.15% | 15.29% | 20.74% |

One interesting feature of the BSTS model techniques described herein, which contributes to its performance, is that it allows the $\beta_t$ term to evolve in time in a systematic way. This is a unique feature of the BSTS approach, and it allows the model described herein to overcome deficits in the GHI data, which does not always correlate well with PV generation due to the discrepancy in spatiotemporal resolution between the GHI data and PV data, as well as the absence of PV generation site configuration data (the PV cell zenith and azimuth at each generating site). While a fairly simple model of the coefficient's evolution was employed, more sophisticated models are possible accounting for seasonalities in the solar site generating capacity. Similar models can be constructed for other covariates, depending on the particular needs of the dataset, for example allowing the power factor to have time-dependence in a model which includes reactive power.

The concrete example analyzed herein shows the efficacy of Bayesian Structural Time Series for probabilistically disaggregating consumer load and PV generation at the feeder-level. Using real AMI data, the example demonstrates that the techniques of the present disclosure perform better than other state-of-the art PV disaggregation models. In addition to accurately estimating the component signals, the techniques described herein also quantify the uncertainty in the estimates. These techniques also have more favorable failure modes, behaving less erratically when the problem is weakly-constrained. The techniques have only been briefly described herein, and other variations will be evident to those skilled in the art. For example, improved estimation accuracy of disaggregated PV generation and gross load can be achieved by employing more sophisticated load models, and fitting time can be reduced through a more sophisticated implementation of the sampling algorithms. The techniques described herein can also be extended to estimate generation and load at the household level, which may utilize higher resolution irradiance and environmental data. Finally, given forecasts of the relevant covariates, the BSTS model-based approach disclosed herein can be extended to provide probabilistic forecasts, both of the net load as well as of the disaggregated, behind-the-meter PV generation.

Figure 6:
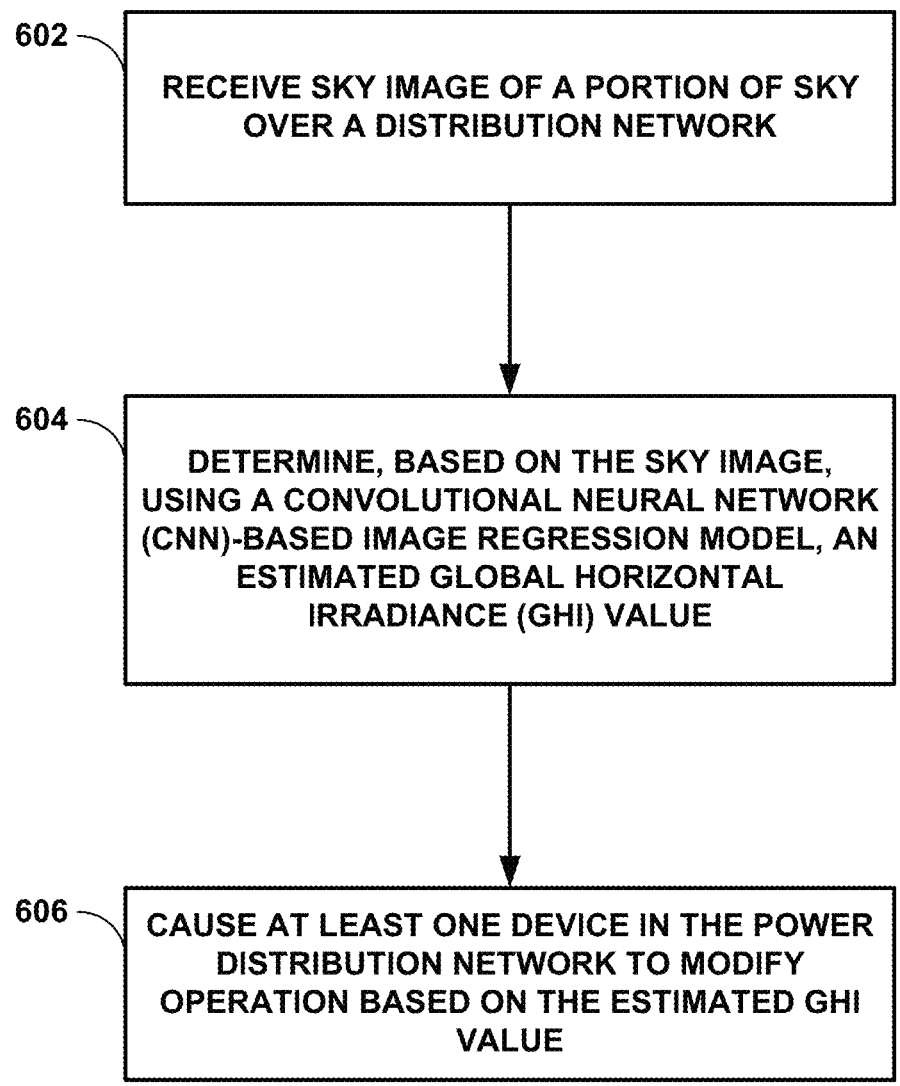
FIG. 6 is a flow diagram illustrating example operations for estimating solar irradiance using sky images and machine learning, in accordance with one or more aspects of the present disclosure.

FIG. 6 is a flow diagram illustrating example operations for estimating solar irradiance using sky images and machine learning, in accordance with one or more aspects of the present disclosure. The operations of FIG. 6 represent only one example process for estimating solar irradiance using sky images and machine learning, and various other or additional operations may be used in other examples. The example operations of FIG. 6 are described below within the context of FIG. 1.

In the example of FIG. 6, an estimation device may receive a sky image of a portion of sky over a power distribution network (602). For example, estimation device 4 may receive a sky image from sky imaging device 3. In some examples, sky imaging device 3 may be collocated with substation 12 and the received sky image may depict a portion of sky that corresponds to the geographic area of the power distribution network shown in FIG. 1.

The estimation device may, in the example of FIG. 6, determine, based on the sky image, using a CNN-based image regression model, an estimated GHI value (604). For example, GHI estimation module 6 of estimation device 4 may provide the sky image to a CNN-based image regression model as input. The CNN-based image regression model may be based on a CNN trained using a corpus of sky images and corresponding GHI values as detailed herein. The CNN-based image regression model may provide, as output, an estimated GHI value.

In the example of FIG. 6, the estimation device may cause at least one device in the power distribution network to modify operation based on the estimated GHI value (606). For example, estimation device 4 may cause one or more of network devices 16 to modify operation based on the estimated GHI value. In some examples, estimation device 4 may cause network devices 16 to modify operation by outputting instructions for use by network devices 16. In some examples, estimation device 4 may cause network devices 16 to modify operation by outputting the estimated GHI value for use by one or more other devices to use in controlling network devices 16. For instance, estimation device 4 may provide the estimated GHI value to substation 12 for use in management and control of the power distribution network depicted in FIG. 1.

Figure 7:
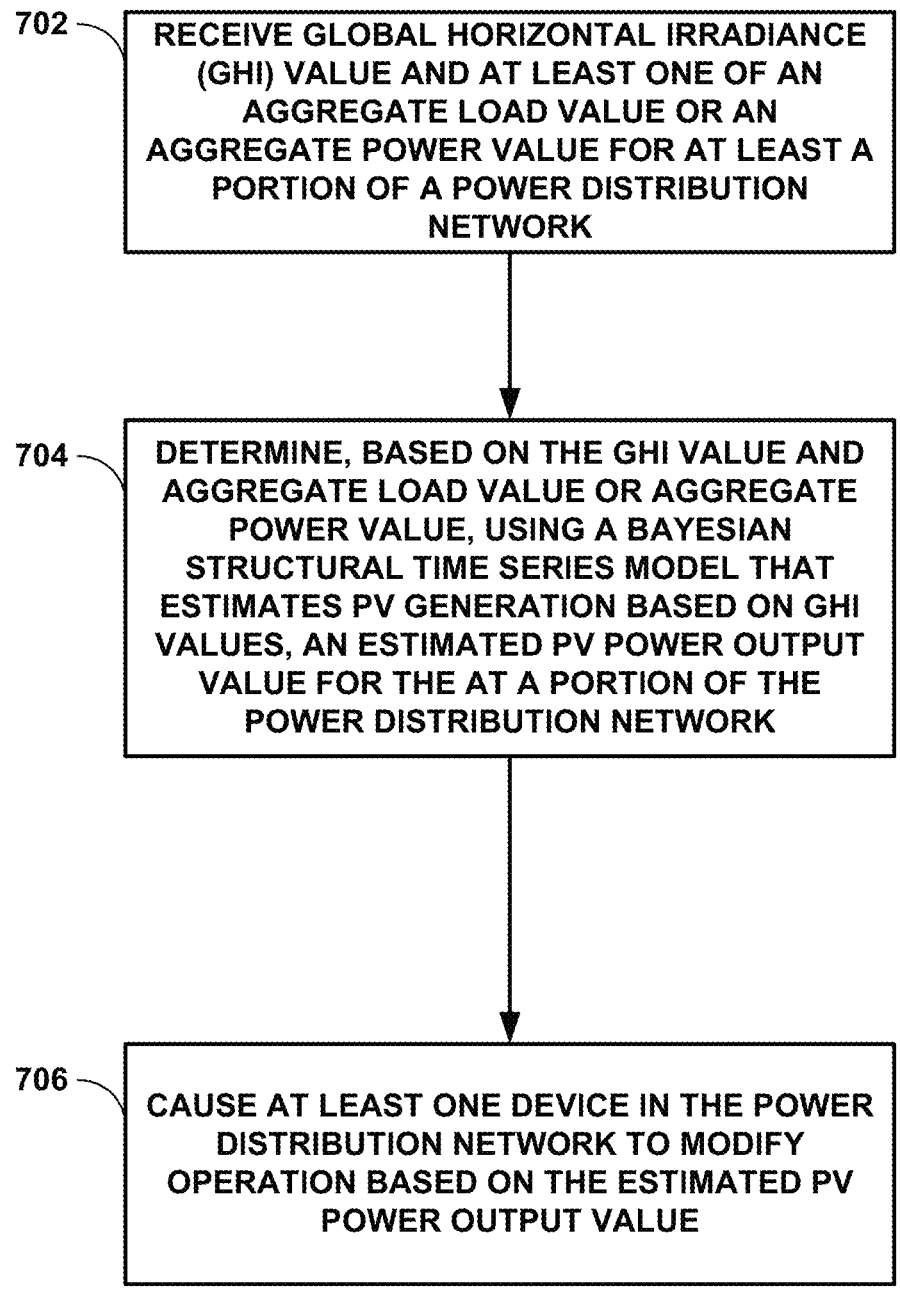
FIG. 7 is a flow diagram illustrating example operations for estimating PV power output across a geographic area using sky images and machine learning, in accordance with one or more aspects of the present disclosure.

FIG. 7 is a flow diagram illustrating example operations for estimating PV power output across a geographic area using sky images and machine learning, in accordance with one or more aspects of the present disclosure. The operations of FIG. 7 represent only one example process for estimating PV power output using sky images and machine learning, and various other or additional operations may be used in other examples. The example operations of FIG. 7 are described below within the context of FIG. 1.

In the example of FIG. 7, an estimation device may receive a GHI value and at least one of an aggregate load value for at least a portion of a power distribution network or an aggregate power value for the at least a portion of the power distribution network (702). For example, estimation device 4 may receive, from substation 12, aggregate net load values in the power distribution network shown in FIG. 1. In some examples, estimation device 4 may receive a measured GHI from a radiometer or other device. In some examples, estimation device 4 may receive an estimated GHI determined by GHI estimation module 6 (e.g., as described with respect to FIG. 6).

In the example of FIG. 7, the estimation device may determine, based on the GHI value and the aggregate net load value, using a BSTS model that estimates PV generation based on GHI values, an estimated PV power output value for the at least a portion of the power distribution network (704). For example, estimation device 4 may provide GHI values and load values to a BSTS model as input. The BSTS model may be trained using a corpus of GHI values and corresponding load values, as detailed herein. The BSTS model may provide, as output, an estimated GHI value. In some examples, the BSTS model may also receive and utilize temperature values as described herein.

In the example of FIG. 7, the estimation device may cause at least one device in the power distribution network to modify operation based on the estimated PV power output value (608). For example, estimation device 4 may cause one or more of network devices 16 to modify operation based on the estimated PV power output value. In some examples, estimation device 4 may cause network devices 16 to modify operation by outputting instructions for use by network devices 16. In some examples, estimation device 4 may cause network devices 16 to modify operation by outputting the estimated PV power output value for use by one or more other devices to use in controlling network devices 16. For instance, estimation device 4 may provide the estimated PV power output value to substation 12 for use in management and control of the power distribution network depicted in FIG. 1.

The example operations of FIG. 6 and/or FIG. 7 may be performed in an iterative fashion. That is, while only a single flow is shown, some or all of operations 502, 504, 506, 602, 604, 606, and 608 may be performed periodically. In some examples, the operations of FIG. 6 and/or FIG. 7 may be performed at a fast frequency (e.g., every second, every 5 seconds, etc.), to provide real time or near real time estimation of GHI and/or PV power output.

The techniques of the present disclosure may additionally or alternatively be described by one or more of the following examples.

Example 1

A device comprising: at least one processor configured to: determine, based on a sky image of a portion of sky over a power distribution network, using a convolutional neural network (CNN)-based image regression model, an estimated global horizontal irradiance (GHI) value; and cause at least one device in the power distribution network to modify operation based on the estimated GHI value.

Example 2

The device of example 1, wherein the CNN-based image regression model comprises five convolutional blocks and a flattening/densifying block.

Example 3

The device of example 2, wherein each of the five convolutional blocks is configured to perform a respective convolution, a respective batch normalization, respective operation by a rectified linear unit (ReLU), and a respective max pooling.

Example 4

The device of any of examples 1-3, wherein the at least one processor is configured to cause the at least one device to modify operation based on the estimated GHI value by: determining, based on the estimated GHI value and an aggregate load value for at least a portion of the power distribution network, using a Bayesian Structural Time Series (BSTS) model that estimates photovoltaic (PV) generation based on GHI values, an estimated PV power output value for the at least a portion of the power distribution network, and causing the at least one device to modify operation based on the estimated PV power output value for the at least a portion of the power distribution network.

Example 5

The device of example 4, wherein the BSTS model comprises a state space model that captures time evolution of state variables.

Example 6

The device of any of examples 4-5, wherein the BSTS model estimates the PV generation based additionally on temperature values.

Example 7

The device of any of examples 1-6, further comprising a sky imaging device configured to capture the sky image.

Example 8

The device of any of examples 1-7, wherein causing the at least one device to modify operation based on the estimated GHI value comprises outputting the estimated GHI value.

Example 9

A device comprising: at least one processor configured to: determine, based on a sky image of a portion of sky over a power distribution network, an estimated global horizontal irradiance (GHI) value; determine, based on the estimated GHI value and an aggregate load value for at least a portion of the power distribution network, using a Bayesian Structural Time Series (BSTS) model that estimates photovoltaic (PV) generation based on GHI values, an estimated PV power output value for the at least a portion of the power distribution network; and cause at least one device in the power distribution network to modify operation based on the estimated PV power output value for the at least a portion of the power distribution network.

Example 10

The device of example 9, wherein the BSTS model comprises a state space model that captures time evolution of state variables.

Example 11

The device of any of examples 9-10, wherein the BSTS model estimates the PV generation based additionally on temperature values.

Example 12

The device of any of examples 9-11, wherein causing the at least one device to modify operation based on the estimated PV power output value for the at least a portion of the power distribution network comprises outputting the estimated PV power output value for the at least a portion of the power distribution network.

Example 13

A method comprising: determining, by a computing device comprising at least one processor, based on a sky image of a portion of sky over a power distribution network, using a convolutional neural network (CNN)-based image regression model, an estimated global horizontal irradiance (GHI) value; and causing at least one device in the power distribution network to modify operation based on the estimated GHI value.

Example 14

The method of example 13, wherein the CNN-based image regression model comprises five convolutional blocks and a flattening/densifying block.

Example 15

The method of example 14, wherein each of the five convolutional blocks is configured to perform a respective convolution, a respective batch normalization, respective operation by a rectified linear unit (ReLU), and a respective max pooling.

Example 16

The method of any of examples 13-15, wherein causing the at least one device to modify operation based on the estimated GHI value comprises: determining, based on the estimated GHI value and an aggregate load value for at least a portion of the power distribution network, using a Bayesian Structural Time Series (BSTS) model that estimates photovoltaic (PV) generation based on GHI values, an estimated PV power output value for the at least a portion of the power distribution network, and causing the at least one device to modify operation based on the estimated PV power output value for the at least a portion of the power distribution network.

Example 17

The method of example 16, wherein the BSTS model comprises a state space model that captures the time evolution of state variables.

Example 18

The method of any of examples 16-17, wherein the BSTS model estimates the PV generation based additionally on temperature values.

Example 19

The method of any of examples 13-18, wherein causing the at least one device to modify operation based on the estimated GHI value comprises transmitting the estimated GHI value to a distribution network management system.

Example 20

The method of any of examples 13-19, further comprising generating, by the computing device, based on a plurality of sky images of the portion of sky and a respective plurality of GHI values, the CNN-based image regression model.

The techniques of the present disclosure will significantly increase the situational awareness of PV and dramatically reduce the uncertainty of distributed PV. By providing fast and accurate estimation information in real time, the techniques described herein will change the current operation schemes of electric power systems which need special energy, regulation, and ramping reserves to account for highly uncertain distributed PV. More broadly, this approach enables widespread, lower-cost adoption of very-high penetration solar by enabling grid operators to run with lean reserve margins while still maintaining and enhancing grid reliability.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device comprising:
at least one processor configured to:
determine, based on a sky image of a portion of sky over a power distribution network, an estimated global horizontal irradiance (GHI) value;
determine, based on the estimated GHI value and an aggregate load value for at least a portion of the power distribution network, using a Bayesian Structural Time Series (BSTS) model that estimates photovoltaic (PV) generation based on GHI values, an estimated PV power output value for the at least a portion of the power distribution network; and
cause at least one device in the power distribution network to modify operation based on the estimated PV power output value for the at least a portion of the power distribution network.

2. The device of claim 1, further comprising a sky imaging device configured to capture the sky image.

3. The device of claim 1, wherein the BSTS model comprises a state space model that captures time evolution of state variables.

4. The device of claim 1, wherein the BSTS model estimates the PV generation based additionally on temperature values.

5. The device of claim 1, wherein causing the at least one device to modify operation based on the estimated PV power output value for the at least a portion of the power distribution network comprises outputting the estimated PV power output value for the at least a portion of the power distribution network.

6. The device of claim 1, further comprising determining the estimated GHI value using a convolutional neural network (CNN)-based image regression model.

7. The device of claim 6, wherein the CNN-based image regression model comprises five convolutional blocks and a flattening/densifying block.

8. The device of claim 7, wherein each of the five convolutional blocks is configured to perform a respective convolution, a respective batch normalization, respective operation by a rectified linear unit (ReLU), and a respective max pooling.

9. A method comprising:
- determining, by a computing device comprising at least one processor, based on a sky image of a portion of sky over a power distribution network, an estimated global horizontal irradiance (GHI) value;
- determine, by the computing device, based on the estimated GHI value and an aggregate load value for at least a portion of the power distribution network, using a Bayesian Structural Time Series (BSTS) model that estimates photovoltaic (PV) generation based on GHI values, an estimated PV power output value for the at least a portion of the power distribution network; and
- causing at least one device in the power distribution network to modify operation based on the estimated PV power output value for the at least a portion of the power distribution network.

10. The method of claim 9, wherein the BSTS model comprises a state space model that captures the time evolution of state variables.

11. The method of claim 9, wherein the BSTS model estimates the PV generation based additionally on temperature values.

12. The method of claim 9, wherein determining the estimated GHI value comprises determining the estimated GHI value using a convolutional neural network (CNN)-based image regression model.

13. The method of claim 12, wherein the CNN-based image regression model comprises five convolutional blocks and a flattening/densifying block.

14. The method of claim 13, wherein each of the five convolutional blocks is configured to perform a respective convolution, a respective batch normalization, respective operation by a rectified linear unit (ReLU), and a respective max pooling.

15. The method of claim 12, further comprising generating, by the computing device, based on a plurality of sky images of the portion of sky and a respective plurality of GHI values, the CNN-based image regression model.

16. The method of claim 9, wherein causing the at least one device to modify operation based on the estimated PV power output value for the at least a portion of the power distribution network comprises outputting the estimated PV power output value for the at least a portion of the power distribution network.

* * * * *